US009765882B2

(12) United States Patent
Hirai et al.

(10) Patent No.: US 9,765,882 B2
(45) Date of Patent: Sep. 19, 2017

(54) HYDRAULIC CONTROL DEVICE OF AUTOMATIC TRANSMISSION

(71) Applicant: AISIN AW CO., LTD., Anjo-shi, Aichi-ken (JP)

(72) Inventors: Nobuyuki Hirai, Anjo (JP); Yoshihiro Maeda, Nagoya (JP); Masamichi Yamaguchi, Anjo (JP); Yoshimitsu Hyodo, Nishio (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/100,816

(22) PCT Filed: Dec. 25, 2014

(86) PCT No.: PCT/JP2014/084387

§ 371 (c)(1),
(2) Date: Jun. 1, 2016

(87) PCT Pub. No.: WO2015/099077

PCT Pub. Date: Jul. 2, 2015

(65) Prior Publication Data

US 2016/0290499 A1 Oct. 6, 2016

(30) Foreign Application Priority Data

Dec. 26, 2013 (JP) ................................ 2013-270424

(51) Int. Cl.
*F16D 19/00* (2006.01)
*F16H 61/02* (2006.01)
(Continued)

(52) U.S. Cl.
CPC ......... *F16H 61/0265* (2013.01); *F16H 3/663* (2013.01); *F16H 61/0021* (2013.01);
(Continued)

(58) Field of Classification Search
None
See application file for complete search history.

(56) References Cited

U.S. PATENT DOCUMENTS 4,560,034 A * 12/1985 Windish ............. F24D 11/0214 188/106 F
4,753,136 A * 6/1988 Hayakawa ......... B60K 17/3467 188/347
(Continued)

FOREIGN PATENT DOCUMENTS

JP H05-296329 A 11/1993
JP H07-217728 A 8/1995
(Continued)

*Primary Examiner* — Dirk Wright
(74) *Attorney, Agent, or Firm* — Oliff PLC

(57) ABSTRACT

The present invention provides a control unit. When the control unit performs shifting from a state in which a first shift speed is established by supplying engagement pressures to both hydraulic oil chambers and engaging a predetermined engagement element to a second shift speed by switching engagement and disengagement states of engagement elements other than the predetermined engagement element (Step S1), the control unit reduces the supply of the engagement pressure to one of the two hydraulic oil chambers to a level lower than that in the state in which the first shift speed is established (Step S3).

12 Claims, 7 Drawing Sheets

10
CONTROL UNIT (ECU)
11
VALVE BODY
50
1
2
20
24
23
21
22
25
26
40
B1
45r
C1
B2
C3
4
C4
5
46p
43r
42r
C2
45c
45p
43p
42p
46s
5a
43c
42c
45s
60
43s
42s
41
46
45
44
47
43
42
3

(51) Int. Cl.

| | |
|---|---|
| ***F16H 61/06*** | (2006.01) |
| ***F16H 61/12*** | (2010.01) |
| ***F16H 3/66*** | (2006.01) |
| ***F16H 61/00*** | (2006.01) |
| *F16H 61/686* | (2006.01) |
| *F16H 63/30* | (2006.01) |

(52) U.S. Cl.
CPC .......... *F16H 61/061* (2013.01); *F16H 61/12* (2013.01); *F16H 63/3026* (2013.01); *F16H 61/686* (2013.01); *F16H 2063/303* (2013.01); *F16H 2200/0069* (2013.01); *F16H 2200/201* (2013.01); *F16H 2200/2046* (2013.01)

(56) References Cited

U.S. PATENT DOCUMENTS

| | | | | |
|---|---|---|---|---|
| 5,426,991 | A | 6/1995 | Ohkawa et al. | |
| 5,511,644 | A * | 4/1996 | Murata | F16D 13/52 192/109 F |
| 5,701,976 | A * | 12/1997 | Kumagai | F16D 55/40 188/71.5 |
| 5,950,787 | A * | 9/1999 | Murasugi | F16D 25/06 192/106 F |
| 6,599,215 | B2 * | 7/2003 | Takatori | F16H 61/061 475/120 |
| 7,140,481 | B2 * | 11/2006 | Hagenow | F16D 25/0638 188/72.4 |
| 8,096,915 | B2 | 1/2012 | Wittkopp et al. | |
| 8,439,785 | B2 * | 5/2013 | Sato | F16H 61/061 475/117 |
| 2009/0312131 | A1 | 12/2009 | Sato et al. | |

FOREIGN PATENT DOCUMENTS

| | | | |
|---|---|---|---|
| JP | H07-317892 | A | 12/1995 |
| JP | 2007-064399 | A | 3/2007 |
| JP | 2009-299817 | A | 12/2009 |

* cited by examiner

FIG. 2

| | C1 | C2 | C3 | C4 | B1 | B2in | B2out |
|---|---|---|---|---|---|---|---|
| Rev | | ○ | ○ | | | ○ | (○) |
| P, N | | ○ | | | | ○ | (○) |
| 1st | ○ | ○ | | | | ○ | (○) |
| 2nd | ○ | | | | ○ | ○ | (○) |
| 3rd | | ○ | | | ○ | ○ | (○) |
| 4th | | | | ○ | ○ | ○ | |
| 5th | | ○ | | ○ | ○ | | |
| 6th | ○ | | | ○ | ○ | | |
| 7th | ○ | | ○ | ○ | | | |
| 8th | | | ○ | ○ | ○ | | |
| 9th | ○ | | ○ | | ○ | | |
| 10th | | ○ | ○ | | ○ | | |

HYDRAULIC CONTROL DEVICE OF AUTOMATIC TRANSMISSION

BACKGROUND

The present disclosure relates to a hydraulic control device of an automatic transmission including a plurality of engagement elements that is mounted, for example, on a vehicle, and more in detail, to a hydraulic control device of an automatic transmission that can engage and disengage engagement elements using double-chamber hydraulic servos each including a plurality of hydraulic oil chambers for one of the engagement elements.

Conventionally, in a stepped automatic transmission mounted, for example, on a vehicle, a hydraulic control device controls engagement states of a plurality of engagement elements (clutches and brakes) to establish a transmission path in a speed change mechanism at each shift speed, so that multi-speed transmission is achieved. In the stepped automatic transmission and the hydraulic control device described above, hydraulic servos are used to engage and disengage the engagement elements. Such a hydraulic servo commonly includes one hydraulic oil chamber for each of the engagement elements.

For example, in a multi-speed automatic transmission, due to structures of gear trains, engagement elements to be engaged at a first forward speed or a first reverse speed have larger torque shares than those of engagement elements to be engaged at shift speeds other than these shift speeds. For this reason, in the case where a hydraulic pressure is supplied from a linear solenoid valve to the hydraulic oil chamber of each of the engagement elements to be engaged at the first forward speed or the first reverse speed, the linear solenoid valve needs to have a higher gain (displacement of a hydraulic pressure output with respect to displacement of a current command value) than the case in which the hydraulic pressure is supplied to hydraulic oil chambers of other engagement elements. This may degrade controllability of the engagement elements to be engaged at the first forward speed or the first reverse speed. The engagement elements to be engaged at the first forward speed or the first reverse speed have larger torque shares, so that the supply pressure of an oil pump needs be higher, leading to a design in which a load on a pump is high. In the case of establishing the shift speeds other than the first forward speed and the first reverse speed that use such engagement elements, the supply pressure of the oil pump need not be so high because of smaller torque shares. Despite of this, the high load on the pump inhibits improvement in fuel consumption.

On the other hand, a double-chamber hydraulic servo has been developed which includes a plurality of hydraulic oil chambers for each engagement element (refer to Japanese Patent Application Publication No. 2007-64399). The double-chamber hydraulic servo includes first and second hydraulic oil chambers, which can be supplied with respective engagement pressures using hydraulic pressure supplying paths separate from each other. The engagement element to be engaged can have different torque capacities between a case of supplying an engagement pressure only to the first hydraulic oil chamber and a case of supplying the engagement pressures to both of the two hydraulic oil chambers. With this structure, both of the two hydraulic oil chambers are supplied with the engagement pressures during engagement when a large torque capacity is required, and only the first hydraulic oil chamber is supplied with the engagement pressure during engagement when the large torque capacity is not required. Hence, the load on the oil pump, for example, can be reduced to improve the fuel consumption.

SUMMARY

However, in a hydraulic control device of an automatic transmission of Japanese Patent Application Publication No. 2007-64399, when a shift operation is performed from a shift speed in which the engagement pressures are supplied to both of the two hydraulic oil chambers of the double-chamber hydraulic servo to engage one engagement element and engage the other engagement elements, to another shift speed while continuing to supply the engagement pressures to both of the two hydraulic oil chambers of the double-chamber hydraulic servo, by switching engagement and disengagement states of the other engagement elements, a tie-up may occur in which engagement elements that should not normally be simultaneously engaged are engaged if a failure occurs in which an engagement element to be disengaged is kept in the engaged state. In this case, in the double-chamber hydraulic servo, the two hydraulic oil chambers are supplied with the engagement pressures, so that the corresponding engagement element has a large torque capacity. Hence, a vehicle equipped with the automatic transmission may be subjected to large deceleration.

The present disclosure according to an exemplary aspect includes a hydraulic control device of an automatic transmission that can suppress large deceleration of a vehicle equipped with the automatic transmission, even if the tie-up occurs when a shift operation is performed from a first shift speed in which engagement pressures are supplied to two hydraulic oil chambers of a double-chamber hydraulic servo that has the two hydraulic oil chambers and can engage and disengage one engagement element, to a second shift speed at which the engagement pressures are supplied to the two hydraulic oil chambers of the hydraulic servo.

According to an exemplary aspect of the present disclosure, a hydraulic control device of an automatic transmission including a plurality of engagement elements and being capable of establishing a plurality of shift speeds by simultaneously engaging at least selected two of the engagement elements, the hydraulic control device including: two hydraulic oil chambers, wherein a predetermined engagement element of the engagement elements is an engagement element with the two hydraulic oil chambers and is engageable and disengageable when an engagement pressure is supplied to and discharged from at least one of the two hydraulic oil chambers, and a control unit that reduces supply of the engagement pressure to one of the two hydraulic oil chambers to a level lower than that in a state in which a first shift speed is established, when the control unit performs shifting from the state in which the first shift speed is established by supplying the engagement pressures to both of the two hydraulic oil chambers and engaging the predetermined engagement element to a second shift speed by switching engagement and disengagement states of engagement elements other than the predetermined engagement element.

With this structure, the control unit reduces the supply of the engagement pressure to one of the two hydraulic oil chambers when the control unit performs the shifting from the state in which the first shift speed is established by engaging the predetermined engagement element including the two hydraulic oil chambers to the second shift speed by switching the engagement and disengagement states of the engagement elements other than the predetermined engagement element. Thus, the supply of the engagement pressure to one of the hydraulic oil chambers is reduced, so that the torque capacity of the engagement element to be engaged by the hydraulic servos is small compared to the case in which the engagement pressures are supplied to the two hydraulic oil chambers. Hence, one of the engagement elements slides at smaller torque, so that large deceleration of a vehicle equipped with the automatic transmission is suppressed even if the tie-up occurs during the shifting performed by switching the engagement and disengagement states of the engagement elements. The term "reduce" as used herein has meanings including a case in which a hydraulic pressure being supplied is reduced or cut off externally and a case in which the hydraulic pressure being supplied is not brought into a supply state.

BRIEF DESCRIPTION OF THE DRAWINGS

FIG. 2 is an engagement table of the automatic transmission according to the embodiment of the present disclosure.

DETAILED DESCRIPTION OF EMBODIMENTS

Figure 1:
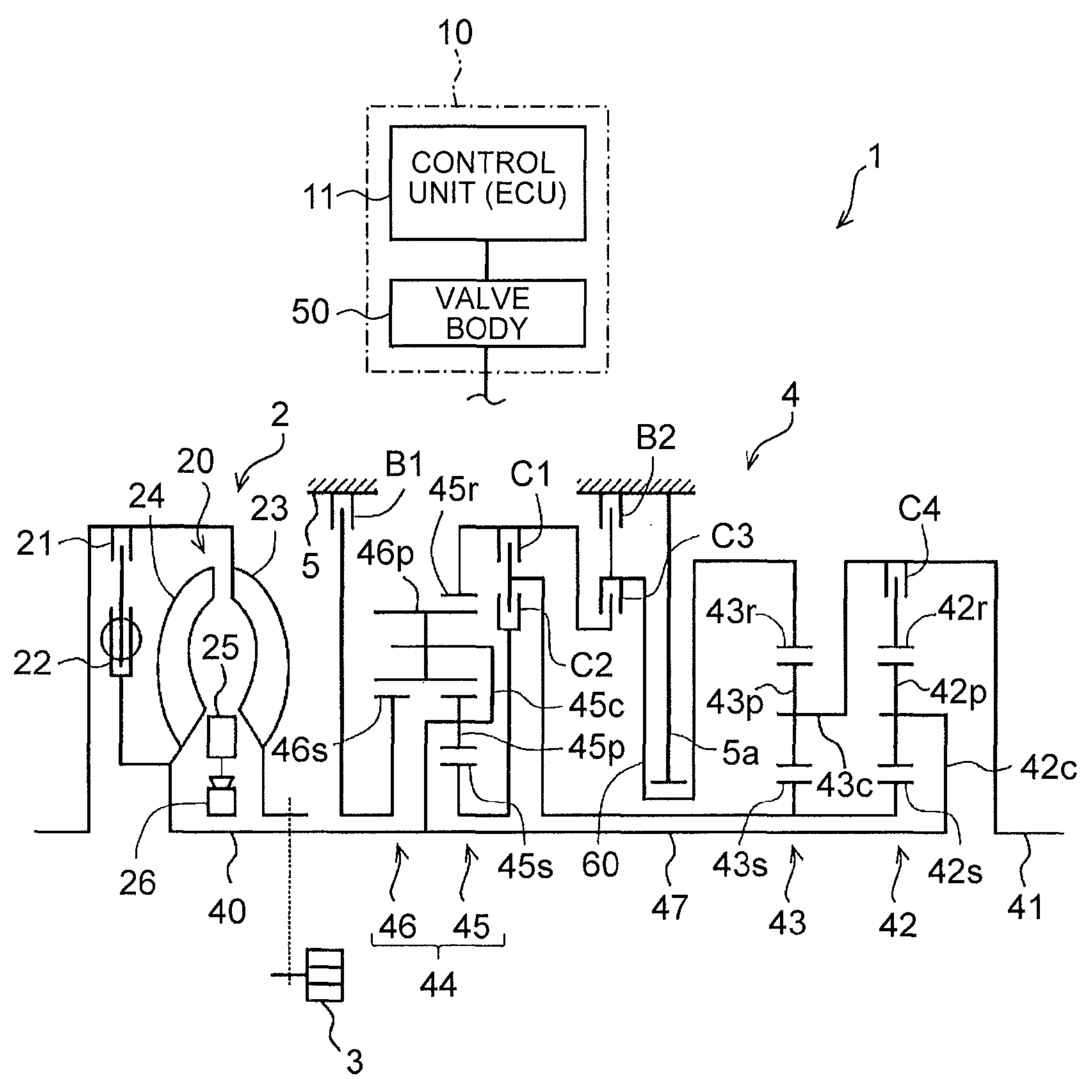
FIG. 1 is a skeleton diagram showing an automatic transmission according to an embodiment of the present disclosure.

Embodiments according to the present disclosure will be described with reference to FIGS. 1 to 7.

First, a schematic structure of an automatic transmission 1 to which the present disclosure can be applied will be described with reference to FIGS. 1 to 3. The automatic transmission 1 according to the present embodiment is connected to a crankshaft of an engine (internal combustion engine) or a rotor of an electric motor (not shown) serving as a driving source longitudinally mounted at the front of a rear wheel drive vehicle, and is capable of transmitting power (torque) from the engine or the like to right and left wheels (driving wheels) (not shown). The automatic transmission 1 includes a starting device (fluid transmission apparatus) 2, an oil pump 3, a speed change mechanism 4 for changing the speed of the power transmitted from the engine or the like to an input shaft 40 and transmitting the power to an output shaft 41, and a transmission case 5 for accommodating these components.

The starting device 2 includes a torque converter 20, a lock-up clutch 21 that can connect and disconnect a front cover coupled to, for example, the crankshaft of the engine to and from the input shaft 40 of the speed change mechanism 4, and a damper mechanism 22 for attenuating vibrations between the front cover and the input shaft 40 of the speed change mechanism 4. The torque converter 20 includes a pump impeller 23 on the input side that is coupled to the front cover, a turbine runner 24 on the output side that is coupled with the input shaft 40 of the speed change mechanism 4, a stator 25 that is placed inside the pump impeller 23 and the turbine runner 24 and regulates the flow of hydraulic oil from the turbine runner 24 to the pump impeller 23, and a one-way clutch 26 that is supported by a stator shaft (not shown) and limits the direction of rotation of the stator 25 to one direction. The torque converter 20 may be replaced with a fluid coupling that does not include the stator 25.

The oil pump 3 is structured as a gear pump that includes, for example, a pump assembly including a pump body and a pump cover, an external gear (inner rotor) coupled to the pump impeller 23 of the torque converter 20 via a chain or a gear train, and an internal gear (outer rotor) meshing with the external gear. The oil pump 3 is driven by the power from the engine or the like so as to suction hydraulic oil stored in an oil pan (not shown) and to pressure-feed the hydraulic oil to a valve body 50 of a hydraulic control device 10 (to be described later).

The speed change mechanism 4 is structured as a ten-speed transmission, and includes the input shaft 40, the output shaft 41 coupled to the right and left wheels via a differential gear and drive shafts (all not shown), single-pinion type first and second planetary gears 42 and 43 that are arranged side by side in the axial direction of the input shaft 40 and the output shaft 41, and a planetary gear set 44 that is a Ravigneaux type planetary gear mechanism structured by combining a double-pinion type planetary gear with a single-pinion type planetary gear. To change a power transmission path from the input shaft 40 to the output shaft 41, the speed change mechanism 4 includes the following six engagement elements: a first clutch C1, a second clutch C2, a third clutch C3, a fourth clutch C4, a first brake B1, and a second brake (predetermined engagement element) B2.

In the present embodiment, the first and the second planetary gears 42 and 43 and the planetary gear set 44 are placed in the transmission case 5 so as to be arranged in the order of the planetary gear set 44, the second planetary gear 43, and the first planetary gear 42 from the starting device 2 side, that is, from the engine side (from the left side in FIG. 1). Accordingly, the planetary gear set 44 is placed on the front side of the vehicle so as to be closer to the starting device 2, the first planetary gear 42 is placed on the rear side of the vehicle so as to be closer to the output shaft 41, and the second planetary gear 43 is placed between the planetary gear set 44 and the first planetary gear 42.

The first planetary gear 42 includes a first sun gear 42*s* serving as an external gear, a first ring gear 42*r* serving as an internal gear arranged concentrically with the first sun gear 42*s*, a plurality of first pinion gears 42*p* each meshing with the first sun gear 42*s* and the first ring gear 42*r*, and a first carrier 42*c* rotatably (turnably) and revolvably supporting the first pinion gears 42*p*. In the present embodiment, a gear ratio $\lambda 1$ (the number of teeth of the first sun gear 42*s*/the number of teeth of the first ring gear 42*r*) of the first planetary gear 42 is set so that, for example, $\lambda 1=0.277$.

The first carrier 42*c* of the first planetary gear 42 is constantly coupled (fixed) to an intermediate shaft 47 of the speed change mechanism 4 coupled to the input shaft 40. As a result, the power from the engine or the like is always transmitted to the first carrier 42*c* via the input shaft 40 and the intermediate shaft 47 while the power is transmitted from the engine or the like to the input shaft 40. The first carrier 42*c* serves as an input element of the first planetary gear 42 while the fourth clutch C4 is engaged, and idles while the fourth clutch C4 is disengaged. The first ring gear 42*r* serves as an output element of the first planetary gear 42 while the fourth clutch C4 is engaged.

The second planetary gear 43 includes a second sun gear 43*s* serving as an external gear, a second ring gear 43*r* serving as an internal gear arranged concentrically with the second sun gear 43*s*, a plurality of second pinion gears 43*p* each meshing with the second sun gear 43*s* and the second ring gear 43*r*, and a second carrier (planetary carrier) 43*c* rotatably (turnably) and revolvably supporting the second pinion gears 43*p*. In the present embodiment, a gear ratio λ2 (the number of teeth of the second sun gear 43*s*/the number of teeth of the second ring gear 43*r*) of the second planetary gear 43 is set so that, for example, λ2=0.244.

The second sun gear 43*s* of the second planetary gear 43 is integrated (constantly coupled) with the first sun gear 42*s* of the first planetary gear 42, and constantly rotates or stops together (and coaxially) with the first sun gear 42*s*. The first sun gear 42*s* and the second sun gear 43*s* may, however, be structured as separate bodies and constantly connected to each other via a connecting member (not shown). The second carrier 43*c* of the second planetary gear 43 is constantly coupled to the output shaft 41, and rotates or stops together (and coaxially) with the output shaft 41. As a result, the second carrier 43*c* serves as an output element of the second planetary gear 43. Moreover, the second ring gear 43*r* of the second planetary gear 43 serves as a fixable element of the second planetary gear 43.

The planetary gear set 44 is a compound planetary gear mechanism structured by combining a third planetary gear 45 that is a double-pinion type planetary gear with a fourth planetary gear 46 that is a single-pinion type planetary gear. The respective planetary gears are placed in the transmission case 5 so as to be arranged from the engine side in the order of the fourth planetary gear 46, the third planetary gear 45, the second planetary gear 43, and the first planetary gear 42.

The planetary gear set 44 includes a third sun gear 45*s* and a fourth sun gear 46*s* serving as external gears, a third ring gear 45*r* serving as an internal gear arranged concentrically with the third and the fourth sun gears 45*s* and 46*s*, a plurality of third pinion gears (short pinion gears) 45*p* meshing with the third sun gear 45*s*, a plurality of fourth pinion gears (long pinion gears) 46*p* meshing with the fourth sun gear 46*s* and the third pinion gears 45*p* and also meshing with the third ring gear 45*r*, and a third carrier 45*c* rotatably (turnably) and revolvably supporting the third pinion gears 45*p* and the fourth pinion gears 46*p*.

The third planetary gear 45 is constituted by the third sun gear 45*s*, the third carrier 45*c*, the third pinion gears 45*p*, the fourth pinion gears 46*p*, and the third ring gear 45*r*. The fourth planetary gear 46 is constituted by the fourth sun gear 46*s*, the third carrier 45*c*, the fourth pinion gears 46*p*, and the third ring gear 45*r*. In the present embodiment, the planetary gear set 44 is structured such that the third planetary gear 45 has a gear ratio λ3 (the number of teeth of the third sun gear 45*s*/the number of teeth of the third ring gear 45*r*) of, for example, 0.488, and the fourth planetary gear 46 has a gear ratio k4 (the number of teeth of the fourth sun gear 46*s*/the number of teeth of the third ring gear 45*r*) of, for example, 0.581.

The fourth sun gear 46*s* among rotational elements constituting the planetary gear set 44 serves as a fixable element of the planetary gear set 44. In addition, the third carrier 45*c* is constantly coupled (fixed) to the input shaft 40, and also constantly coupled to the first carrier 42*c* of the first planetary gear 42 via the intermediate shaft 47. As a result, the power from the engine or the like is constantly transmitted to the third carrier 45*c* via the input shaft 40 while the power is transmitted from the engine or the like to the input shaft 40. Accordingly, the third carrier 45*c* serves as an input element of the planetary gear set 44. The third ring gear 45*r* serves as a first output element of the planetary gear set 44, and the third sun gear 45*s* serves as a second output element of the planetary gear set 44.

The first clutch C1 connects and disconnects the first sun gear 42*s* of the first planetary gear 42, which is constantly coupled to the second sun gear 43*s* of the second planetary gear 43, to and from the third ring gear 45*r* of the planetary gear set 44. The second clutch C2 connects and disconnects the first sun gear 42*s* of the first planetary gear 42, which is constantly coupled to the second sun gear 43*s* of the second planetary gear 43, to and from the third sun gear 45*s* of the planetary gear set 44. The third clutch C3 connects and disconnects the second ring gear 43*r* of the second planetary gear 43 to and from the third ring gear 45*r* of the planetary gear set 44. The fourth clutch C4 connects and disconnects the first ring gear 42*r* of the first planetary gear 42 to and from the output shaft 41.

The first brake B1 unrotatably holds (connects) the fourth sun gear 46*s* of the planetary gear set 44 stationary to the transmission case 5, and rotatably releases the fourth sun gear 46*s* held stationary from the transmission case 5. The second brake B2 unrotatably holds (connects) the second ring gear 43*r* of the second planetary gear 43 stationary to the transmission case 5, and rotatably releases the second ring gear 43*r* held stationary from the transmission case 5.

The present embodiment employs, as each of the first to fourth clutches C1 to C4, a multi-plate friction hydraulic clutch that includes, a piston, a plurality of friction engagement plates (such as friction plates each structured by attaching friction materials to both surfaces of an annular member and separator plates that is each an annular member with both surfaces smoothly formed), and a hydraulic servo constituted by, for example, an engagement oil chamber and a centrifugal hydraulic pressure canceling chamber each supplied with hydraulic oil. The present embodiment also employs, as each of the first and second brakes B1 and B2, a multi-plate friction hydraulic brake that includes a piston, a plurality of friction engagement plates (friction plates and separator plates), and a hydraulic servo constituted by, for example, an engagement oil chamber supplied with the hydraulic oil.

Figure 5:
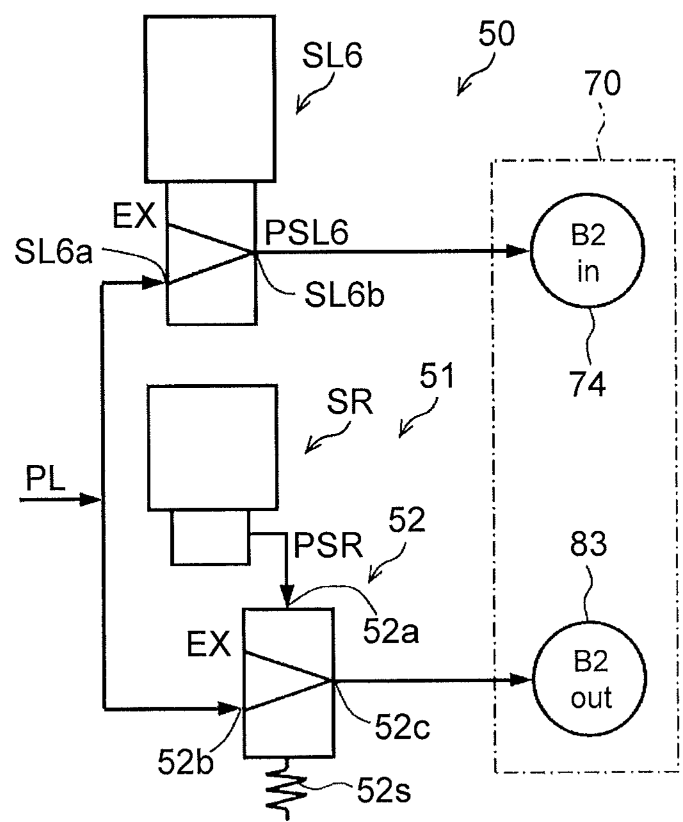
FIG. 5 is a schematic diagram of a hydraulic control device according to the embodiment of the present disclosure.

The automatic transmission 1 further includes a hydraulic servo (not shown) capable of engaging and disengaging the first clutch C1, a hydraulic servo (not shown) capable of engaging and disengaging the second clutch C2, a hydraulic servo (not shown) capable of engaging and disengaging the third clutch C3, a hydraulic servo (not shown) capable of engaging and disengaging the fourth clutch C4, a hydraulic servo (not shown) capable of engaging and disengaging the first brake B1, and a hydraulic servo 70 capable of engaging and disengaging the second brake B2 (refer to FIG. 5). The hydraulic servos of the first to the fourth clutches C1 to C4 and the first and the second brakes B1 and B2 operate in response to supply and discharge of the hydraulic oil by the hydraulic control device 10.

Figure 4:
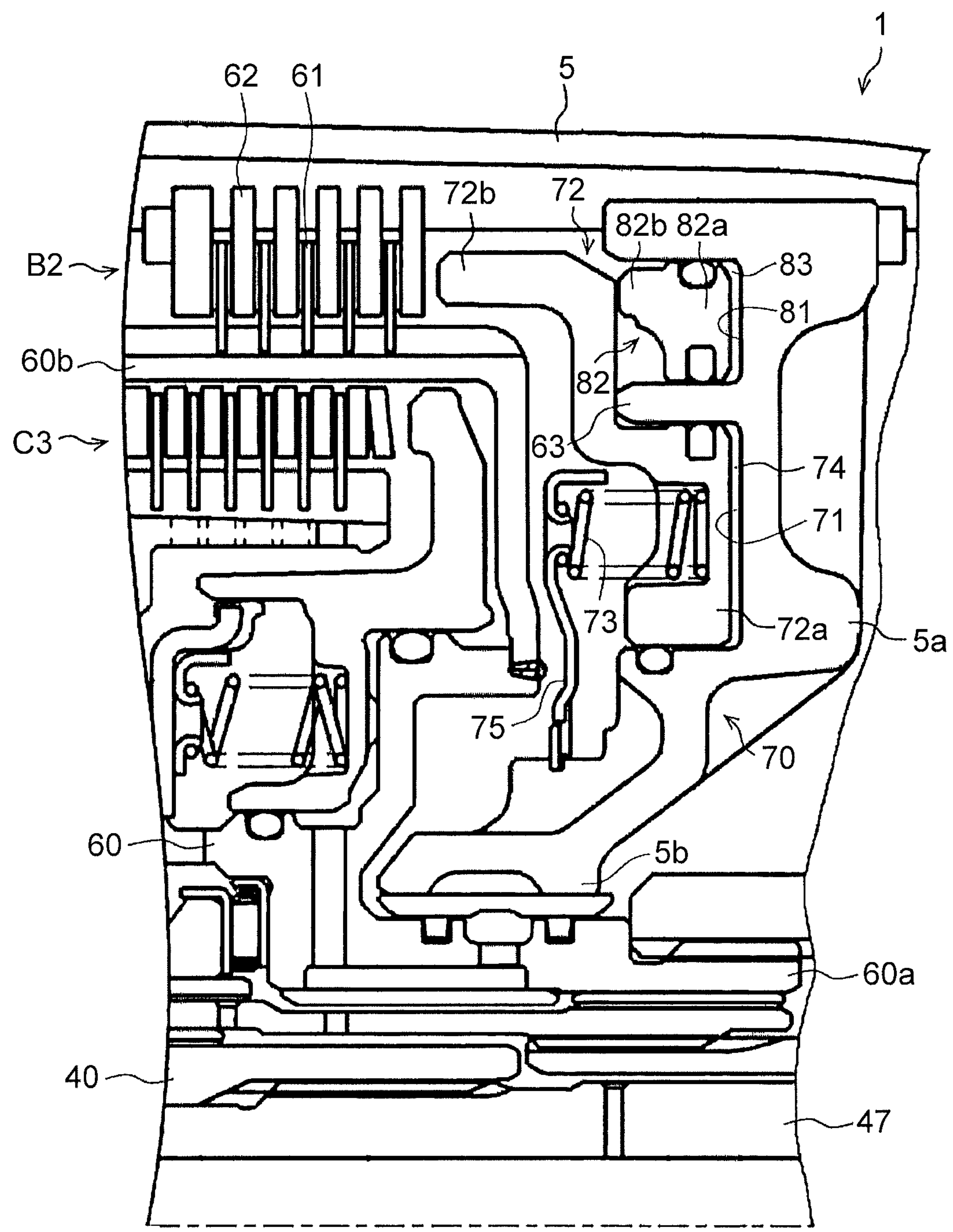
FIG. 4 is a schematic diagram of a hydraulic servo for a second brake according to the embodiment of the present disclosure.

In the present embodiment, the hydraulic servo 70 for the second brake B2 is a double-chamber hydraulic servo having a first hydraulic oil chamber 74 and a second hydraulic oil chamber 83 as two hydraulic oil chambers (refer to FIG. 4). Here, one of the two hydraulic oil chambers serves as the second hydraulic oil chamber 83, and the other of the two hydraulic oil chambers serves as the first hydraulic oil chamber 74. The first and the second hydraulic oil chambers 74 and 83 are used in different manners as follows: only the first hydraulic oil chamber 74 is supplied with a hydraulic pressure when the second brake B2 does not need a high engagement pressure at, for example, medium shift speeds; and both the first and the second hydraulic oil chambers 74 and 83 are supplied with hydraulic pressures when the second brake B2 needs a high engagement pressure at, for example, lower shift speeds (refer to FIG. 2). In other words, the second brake B2 is an engagement element that is engaged to establish at least forward and reverse starting shift speeds (lower shift speeds including the first speed).

FIG. 2 is an engagement table showing relations between shift speeds of the speed change mechanism 4 and operating states of the first to the fourth clutches C1 to C4 and the first and the second brakes B1 and B2. In FIG. 2, B2in represents an engagement state of the second brake B2 based on the supply of an engagement pressure PSL6 to the first hydraulic oil chamber 74 of the hydraulic servo 70, and B2out represents an engagement state of the second brake B2 based on the supply of an engagement pressure PL to the second hydraulic oil chamber 83 of the hydraulic servo 70. FIG. 3 shows velocity diagrams representing ratios of rotational speeds of the respective rotational elements to the rotational speed of the input shaft 40 in the speed change mechanism 4 (where the rotational speed of the input shaft 40, that is, the first carrier 42*c* and the third carrier 45*c*, is assumed to have a value of 1).

Figure 3:
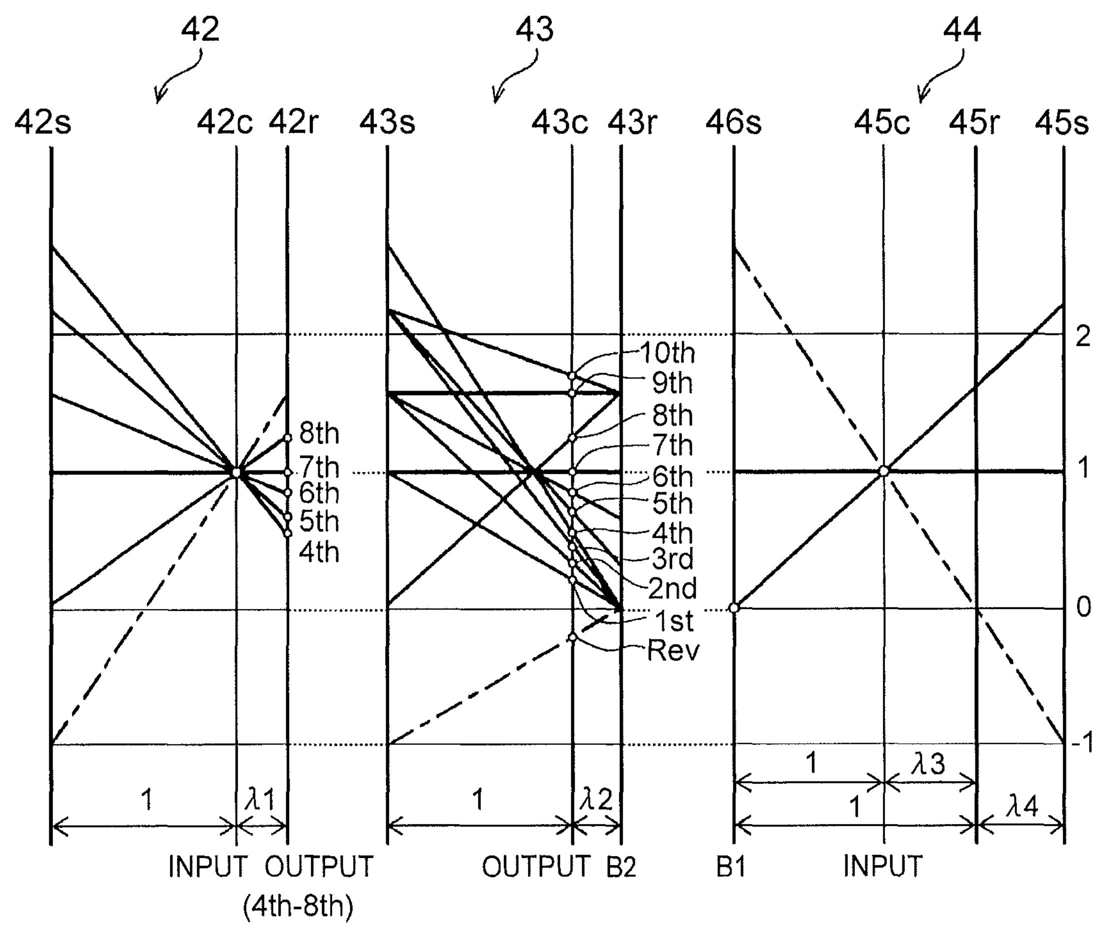
FIG. 3 shows velocity diagrams of the automatic transmission according to the embodiment of the present disclosure.

As shown in FIG. 3, in a velocity diagram of the first planetary gear 42 (velocity diagram on the left side in FIG. 3), three rotational elements, that is, the first sun gear 42*s*, the first ring gear 42*r*, and the first carrier 42*c* constituting the single-pinion type first planetary gear 42 are arranged from the left side in the velocity diagram in the order of the first sun gear 42*s*, the first carrier 42*c*, and the first ring gear 42*r*, at intervals corresponding to the gear ratio λ1. According to the order of arrangement in the velocity diagram described above, the first sun gear 42*s* is referred to as a first rotational element of the automatic transmission 1, the first carrier 42*c* is referred to as a second rotational element of the automatic transmission 1, and the first ring gear 42*r* is referred to as a third rotational element of the automatic transmission 1, in the present embodiment. Accordingly, the first planetary gear 42 includes the first rotational element, the second rotational element, and the third rotational element of the automatic transmission 1 that are sequentially arranged at intervals corresponding to the gear ratio λ1 in the velocity diagram.

In a velocity diagram of the second planetary gear 43 (velocity diagram at the center in FIG. 3), three rotational elements, that is, the second sun gear 43*s*, the second ring gear 43*r*, and the second carrier 43*c* constituting the single-pinion type second planetary gear 43 are arranged from the left side in the velocity diagram in the order of the second sun gear 43*s*, the second carrier 43*c*, and the second ring gear 43*r*, at intervals corresponding to the gear ratio λ2. According to the order of arrangement in the velocity diagram described above, the second sun gear 43*s* is referred to as a fourth rotational element of the automatic transmission 1, the second carrier 43*c* is referred to as a fifth rotational element of the automatic transmission 1, and the second ring gear 43*r* is referred to as a sixth rotational element of the automatic transmission 1, in the present embodiment. Accordingly, the second planetary gear 43 includes the fourth rotational element, the fifth rotational element, and the sixth rotational element of the automatic transmission 1 that are sequentially arranged at intervals corresponding to the gear ratio λ2 in the velocity diagram.

In addition, in a velocity diagram of the planetary gear set 44 (velocity diagram on the right side in FIG. 3), four rotational elements, that is, the fourth sun gear 46*s*, the third carrier 45*c*, the third ring gear 45*r*, and the third sun gear 45*s* constituting the planetary gear set 44 are arranged in this order from the left side in the velocity diagram, at intervals corresponding to the gear ratio λ3 of the single-pinion type third planetary gear 45 and the gear ratio λ4 of the double-pinion type fourth planetary gear 46. According to the order of arrangement in the velocity diagram described above, the fourth sun gear 46*s* is referred to as a seventh rotational element of the automatic transmission 1, the third carrier 45*c* is referred to as an eighth rotational element of the automatic transmission 1, the third ring gear 45*r* is referred to as a ninth rotational element of the automatic transmission 1, and the third sun gear 45*s* is referred to as a tenth rotational element of the automatic transmission 1, in the present embodiment. Accordingly, the planetary gear set 44 includes the seventh rotational element, the eighth rotational element, the ninth rotational element, and the tenth rotational element of the automatic transmission 1 that are sequentially arranged at intervals corresponding to the gear ratios λ3 and λ4 in the velocity diagram.

The automatic transmission 1 structured as described above engages and disengages the first to the fourth clutches C1 to C4 and the first and the second brakes B1 and B2 shown in the skeleton diagram of FIG. 1 according to the combinations shown in the engagement table of FIG. 2, and establishes a first forward speed (1st) to a tenth forward speed (10th) and a first reverse speed (Rev) at rotational speed ratios shown in the velocity diagrams of FIG. 3. The automatic transmission 1 changes the shift speed by switching engagement and disengagement states of at least two of the engagement elements during the shifting.

The seventh forward speed is established by engaging the first, the third, and the fourth clutches C1, C3, and C4, and disengaging the remaining engagement elements, that is, the second clutch C2 and the first and the second brakes B1 and B2. Specifically, the seventh forward speed requires neither the first brake B1 nor the second brake B2 to be engaged, so that a direct coupling speed is established. Consequently, the seventh forward speed is established by engaging any three of the four clutches. In the present embodiment, a gear ratio y7 at the seventh forward speed results in 1.000.

Next, structures of the second brake B2 and the hydraulic servo 70 of the automatic transmission 1 according to the present disclosure will be described based on FIG. 4.

The second brake B2 and the third clutch C3 are placed on a side opposite in the axial direction to the second ring gear 43*r* of the second planetary gear 43 with respect to a center support 5*a* integrated with the transmission case 5, and are coupled to the second ring gear 43*r* by a drum member 60 (refer to FIG. 1). The drum member 60 includes a cylindrical portion 60*a* provided on the outer circumferences of the input shaft 40 and the intermediate shaft 47, and also includes a cylindrical drum portion 60*b* that has a diameter larger than that of the cylindrical portion 60*a* and is open at one end thereof (at the left end thereof in FIG. 4). The center support 5*a* extends radially inward from the inner circumferential surface of the transmission case 5, and includes a cylindrical inner circumferential portion 5*b* having a center hole. The inner circumferential portion 5*b* rotatably supports the cylindrical portion 60*a* via a bush.

Splines are provided on the inner and the outer circumferential surfaces of the drum portion 60*b* of the drum member 60.

The second brake B2 includes a plurality of friction plates 61, a plurality of separator plates 62 arranged alternately with the friction plates 61, and a backing plate. The friction plates 61 are fitted with the splines provided on the outer circumferential surface of the drum portion 60*b* so as to rotate together with the drum portion 60*b*, and are supported by the drum member 60 serving as a brake hub so as to be movable in the axial direction. The separator plates 62 are fitted with splines provided on the inner circumferential surface of the transmission case 5, and are supported by the transmission case 5 so as to be unrotatable and movable axially with respect to the transmission case 5.

The automatic transmission 1 includes the hydraulic servo 70 for engaging the second brake B2. The hydraulic servo 70 has a double-chamber structure having the first and the second hydraulic oil chambers 74 and 83, which are defined by separate sets of pistons and recesses.

The first hydraulic oil chamber 74 is defined by an annular first recess 71 formed in a side portion on the second brake B2 side of the center support 5*a* and by a first piston 72 slidably fitted in the axial direction into the first recess 71. The first piston 72 can engage the second brake B2 by pressing the friction plates 61 and the separator plates 62, and includes an annular first pressure receiving portion 72*a* and a plate pressing portion 72*b* that can press the friction plates 61 and the separator plates 62. Seal members such as O-rings are provided between the inner circumferential surface of the first pressure receiving portion 72*a* and a surface on the inner circumferential side of the first recess 71, and between the outer circumferential surface of the first pressure receiving portion 72*a* and a surface on the outer circumferential side of the first recess 71. In this manner, the first pressure receiving portion 72*a* is supported by the center support 5*a* so as to be movable in the axial direction, and defines the first hydraulic oil chamber 74 with the center support 5*a*. The plate pressing portion 72*b* is formed so as to extend radially outward from the first pressure receiving portion 72*a*, and projects in the axial direction so as to be capable of abutting at a distal end thereof on the separator plate 62 located closest to the hydraulic servo 70.

The first pressure receiving portion 72*a* is urged by a return spring 73 constituted by a plurality of coil springs. The coil springs of the return spring 73 are arranged with spaces therebetween in the circumferential direction between a recess formed on the second brake B2 side of the first pressure receiving portion 72*a* and an annular spring support member 75 fixed to the center support 5*a*. The spring support member 75 is fixed to the center support 5*a* using a snap ring. In this manner, the return spring 73 urges the first piston 72 so as to be away from the friction plates 61 and the separator plates 62. Instead of the coil springs, one leaf spring or a plurality of leaf springs may be used as the return spring 73.

The second hydraulic oil chamber 83 is defined by an annular second recess 81 formed on the outer circumferential side of the first recess 71 at a side portion of the second brake B2 side of the center support 5*a* and by a second piston 82 slidably fitted in the axial direction into the second recess 81. The second piston 82 is placed on a side opposite to the second brake B2 with respect to the first piston 72, and can press the first piston 72 in the slidable direction to press the friction plates 61 and the separator plates 62 so as to engage the second brake B2. The second piston 82 includes an annular second pressure receiving portion 82*a* and a piston pressing portion 82*b* that can press the first piston 72. Seal members such as O-rings are provided between the inner circumferential surface of the second pressure receiving portion 82*a* and a surface on the inner circumferential side of the second recess 81, and between the outer circumferential surface of the second pressure receiving portion 82*a* and a surface on the outer circumferential side of the second recess 81. In this manner, the second pressure receiving portion 82*a* is supported by the center support 5*a* so as to be movable in the axial direction, and defines the second hydraulic oil chamber 83 in cooperation with the center support 5*a*. In the present embodiment, the first and the second recesses 71 and 81 are partitioned by an annular partition wall 63 so as not to communicate with each other, and are formed so as to have substantially the same axial length as each other.

The first and the second hydraulic oil chambers 74 and 83 can be separately supplied with engagement hydraulic pressures (hydraulic oil) regulated by the hydraulic control device 10 through oil passages formed in the intermediate shaft 47 and the center support 5*a*. Specifically, in the present embodiment, supplying a hydraulic pressure to the first hydraulic oil chamber 74 refers to engagement of B2in, and supplying a hydraulic pressure to the second hydraulic oil chamber 83 refers to engagement of B2out.

Next, the hydraulic control device 10 of the automatic transmission 1 according to the present disclosure will be described.

As shown in FIG. 1, the hydraulic control device 10 includes the valve body 50 and a control unit (hereinafter, also called an ECU) 11. The valve body 50 is controlled by the ECU 11, and includes, for example, an oil pump and a primary regulator valve for regulating a hydraulic pressure from the oil pump into the engagement pressure PL serving as a line pressure (not shown), and regulates and generates various source pressures.

As shown in FIG. 5, the valve body 50 includes a linear solenoid valve (solenoid valve) SL6 and a cut-off mechanism 51. The linear solenoid valve SL6 includes an input port SL6*a* for receiving the engagement pressure PL and an output port SL6*b* to be connected to the first hydraulic oil chamber 74, and is capable of outputting the engagement pressure PSL6 from the output port SL6*b* according to a control signal from the ECU 11. That is, the linear solenoid valve SL6 regulates and supplies the engagement pressure to the first hydraulic oil chamber 74.

The valve body 50 includes a linear solenoid valve (not shown) that can supply a hydraulic pressure to the hydraulic servo for engaging and disengaging the first clutch C1, a linear solenoid valve (not shown) that can supply a hydraulic pressure to the hydraulic servo for engaging and disengaging the second clutch C2, a linear solenoid valve (not shown) that can supply a hydraulic pressure to the hydraulic servo for engaging and disengaging the third clutch C3, a linear solenoid valve (not shown) that can supply a hydraulic pressure to the hydraulic servo for engaging and disengaging the fourth clutch C4, and a linear solenoid valve (not shown) that can supply a hydraulic pressure to the hydraulic servo for engaging and disengaging the first brake B1. Each of the linear solenoid valves employs a normally closed (N/C) type valve that cuts off communication between an input port and an output port when electricity is not conducted (hereinafter, also called an OFF state) and communicates the input port with the output port when electricity is conducted (hereinafter, also called an ON state).

The cut-off mechanism 51 is a normally closed type mechanism, and includes a solenoid valve SR that can output a signal pressure PSR according to the control signal from the ECU 11 and a switching valve 52 that is capable of switching by the signal pressure PSR. The switching valve 52 includes an input port 52*b* for receiving the engagement pressure PL, an output port 52*c* connected to the second hydraulic oil chamber 83, a spool (not shown) that is capable of switching between a communication position of communicating the input port 52*b* with the output port 52*c* and a cut-off position of cutting off communication between the input port 52*b* and the output port 52*c*, a spring (urging member) 52*s* for urging the spool toward the cut-off position, and an oil chamber 52*a* that is supplied with the signal pressure PSR to urge the spool toward the communication position against the spring 52*s*. With this structure, the signal pressure PSR is output from the solenoid valve SR to switch the switching valve 52 to the communication position, and the engagement pressure PL is supplied to the second hydraulic oil chamber 83, and the signal pressure PSR is stopped to switch the switching valve 52 to the cut-off position, and the second hydraulic oil chamber 83 is released such that the engagement pressure PL is drained. That is, the cut-off mechanism 51 performs the switching between supply and cut-off of the engagement pressure with respect to the second hydraulic oil chamber 83.

The ECU 11 is configures as follows: the engagement pressures PSL6 and PL are supplied to both of the two first and second hydraulic oil chambers 74 and 83 to engage the second brake B2, and from the state in which the first forward speed (first shift speed) is established, the engagement and disengagement states of the engagement elements other than the second brake B2 are switched to perform shifting to, for example, the third forward speed (second shift speed). In this case, the ECU 11 reduces (cuts off, in the present embodiment) the supply of the engagement pressure PL to the second hydraulic oil chamber 83 to a level lower than that in the state in which the first forward speed is established (refer to FIGS. 7A and 7B). Here, the ECU 11 cuts off the engagement pressure PL on the condition that the accelerator operation amount is equal to or smaller than a threshold. This is because, when the accelerator operation amount is equal to or smaller than a threshold as in the case of coasting down or power-off upshifting, the engine torque is low, and the torque capacity required for the second brake B2 during the shifting is relatively small. Therefore, a sufficient torque capacity is ensured without an engagement pressure caused by the second piston 82. Hence, the threshold may be set based on shift speeds before and after the shifting, and the torque capacity required for the second brake B2 during the shifting, or may be set in advance to a uniform predetermined value for determination of the shifting during the coast-down state and the power-off upshifting.

Figure 7A:
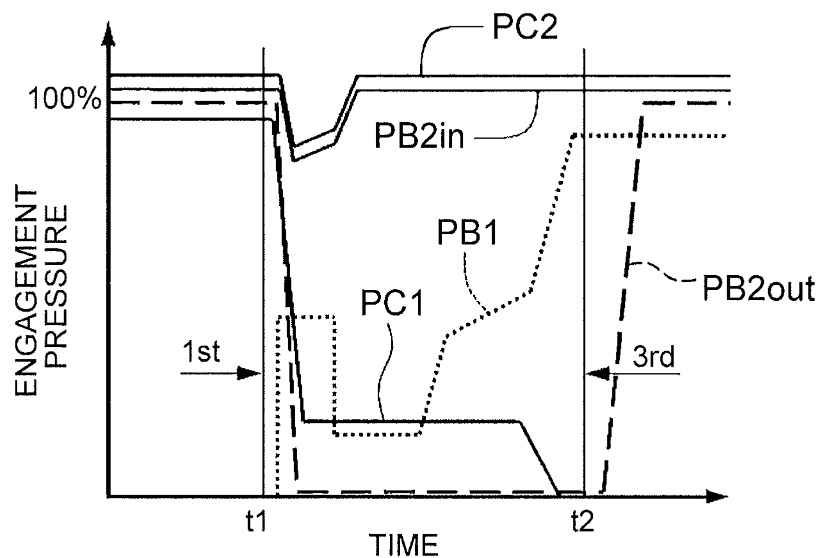
FIG. 7 is time charts showing the operation procedure of the hydraulic control device during shifting according to the embodiment of the present disclosure, with FIG. 7A showing the operation procedure during a normal operation, and FIG. 7B showing the operation procedure during failure.
Figure 7B:
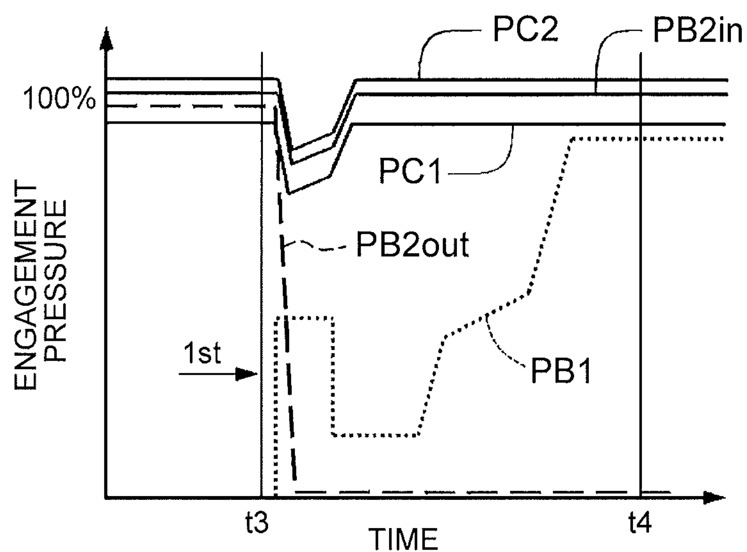

When the ECU 11 performs the shifting to the third forward speed by switching the engagement and disengagement states of the engagement elements other than the second brake B2 from the state in which the first forward speed is established by supplying the engagement pressures PSL6 and PL to both of the two first and second hydraulic oil chambers 74 and 83 and engaging the second brake B2, the ECU 11 maintains the supply of the engagement pressure PSL6 to the first hydraulic oil chamber 74 in a similar manner to the state in which the first forward speed is established (refer to FIGS. 7A and 7B). This operation surely maintains the shifting operation to the third forward speed.

The automatic transmission 1 is mounted on the vehicle, such as an automobile, and is provided with an accelerator operation amount detector (not shown) that detects the accelerator operation amount, input shaft rotational speed detector that detects the rotational speed of the input shaft, and vehicle speed detector that detects an actual speed of the vehicle.

If, based on an actual gear ratio obtained from the input shaft rotational speed detector and the vehicle speed detector, the ECU 11 determines that the shifting has been completed by switching the engagement and disengagement states of the engagement elements, the ECU 11 stops reducing the supply of the engagement pressure PL to the second hydraulic oil chamber 83, and increases the engagement pressure PL to the second hydraulic oil chamber 83. Specifically, in the present embodiment, the ECU 11 controls the cut-off mechanism 51 to cancel the cut-off of the supply of the engagement pressure PL to the second hydraulic oil chamber 83 (refer to FIG. 7A). If, based on the actual gear ratio obtained from the input shaft rotational speed detector and the vehicle speed detector, the ECU 11 determines that the shifting has not been completed by switching the engagement and disengagement states of the engagement elements, the ECU 11 maintains a cut-off state of the supply of the engagement pressure PL to the second hydraulic oil chamber 83 (refer to FIG. 7B).

Figure 6:
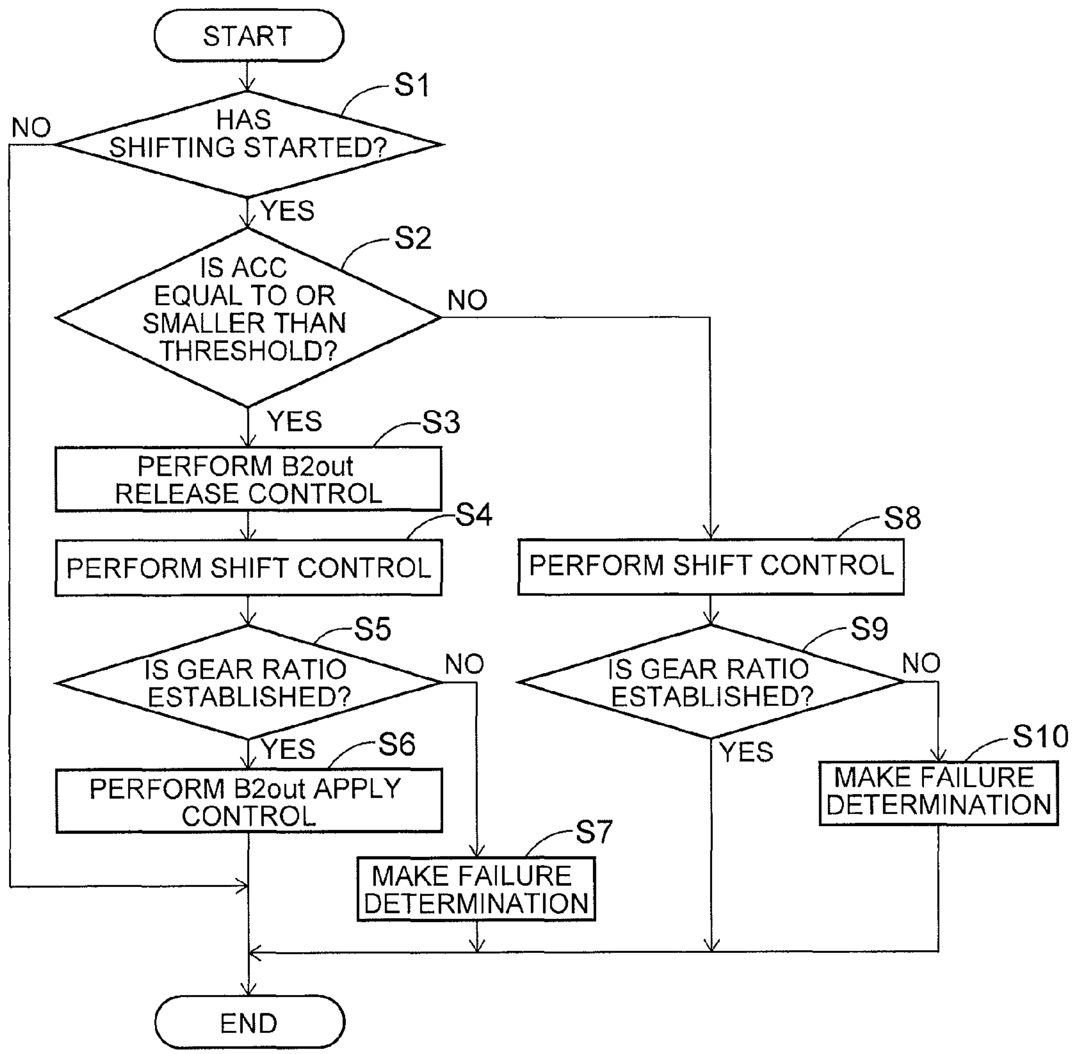
FIG. 6 is a flowchart showing an operation procedure of the hydraulic control device during shifting according to the embodiment of the present disclosure.

Next, an operation of the hydraulic control device 10 of the automatic transmission 1 according to the present embodiment will be described with reference to a flowchart of FIG. 6 and time charts of FIG. 7. The time charts of FIG. 7 show temporal changes in the following engagement pressures when shifting is performed from the first forward speed (1st) to the third forward speed (3rd): an engagement pressure PC1 of the hydraulic servo for the first clutch C1, an engagement pressure PC2 of the hydraulic servo for the second clutch C2, an engagement pressure PB1 of the hydraulic servo for the first brake B1, an engagement pressure PB2in of the first hydraulic oil chamber 74 of the hydraulic servo 70 for the second brake B2, and an engagement pressure PB2out of the second hydraulic oil chamber 83 of the hydraulic servo 70 for the second brake B2. FIG. 7A shows the temporal change when the shifting is normal. FIG. 7B shows the temporal change when a failure occurs in which the engagement pressure PC1 of the hydraulic servo for the first clutch C1 is maintained during the shifting.

The ECU 11 determines whether the shifting operation has started from the first shift speed (such as the first forward speed) at which the engagement pressures PSL6 and PL are supplied to both of the two first and second hydraulic oil chambers 74 and 83 to the second shift speed (such as the third forward speed) at which the engagement pressures PSL6 and PL are supplied to both of the two first and second hydraulic oil chambers 74 and 83 (Step S1). This determination is made based on whether the actual gear ratio obtained from the input shaft rotational speed detector and the vehicle speed detector has changed by a predetermined amount or larger, or based on whether the ECU 11 has determined to start the shifting operation. If the ECU 11 determines that the shifting operation has not started, the ECU 11 ends the processing.

If the ECU 11 determines that the shifting operation has started, the ECU 11 determines whether the accelerator operation amount (ACC) is equal to or smaller than the threshold (Step S2). If the ECU 11 determines that the accelerator operation amount is equal to or smaller than the threshold, the ECU 11 cuts off the supply of the engagement pressure PL to the second hydraulic oil chamber 83 so as to stop the supply of the engagement pressure to the second brake B2 by the second piston 82 (B2out release control) (Step S3). Then, the ECU 11 starts shift control by disengaging one of the engagement elements (such as the first clutch C1) (Step S4, at t1 in FIG. 7A or at t3 in FIG. 7B), and engages the other engagement elements (such as the first brake B1) to perform the shifting through the engagement and disengagement switching operations (at and after t1 in FIG. 7A or at and after t3 in FIG. 7B).

After starting the shift control, the ECU 11 determines whether the gear ratio of the target shift speed after the shifting is established (Step S5). This determination is made based on whether the actual gear ratio obtained from the input shaft rotational speed detector and the vehicle speed detector falls within a predetermined range of the target gear ratio. If the ECU 11 determines that the gear ratio of the target shift speed is established, the ECU 11 cancels the cut-off of the engagement pressure PL to the second hydraulic oil chamber 83 so as to apply the engagement pressure to the second brake B2 using the second piston 82 (B2out apply control) (Step S6, at and after t2 in FIG. 7A).

If the ECU 11 cannot determine, in a predetermined period of time after the shifting is established, that the gear ratio of the target shift speed is established, the ECU 11 determines that a failure may have occurred in which the engagement elements are not appropriately switched, and makes failure determination (Step S7, at and after t4 in FIG. 7B). At this time, four engagement elements consisting of the first and the second clutches C1 and C2, and the first and the second brakes B1 and B2 are brought into the tie-up state. However, the second brake B2 is engaged only by the engagement pressure PB2in of the first hydraulic oil chamber 74 and thus the second brake B2 slides, so that a large deceleration does not occur. If the ECU 11 determines that the failure has occurred, the ECU 11 enters, for example, a fail-safe mode, and performs appropriate processing, such as returning the shift speed to the previous shift speed or switching to another shift speed.

If the ECU 11 determines that the accelerator operation amount is not equal to or smaller than the threshold at Step S2, the ECU 11 starts the shift control by disengaging one of the engagement elements (such as the first clutch C1) (Step S8) without performing any pre-operation, and engages the other engagement elements (such as the first brake B1) to perform the shifting by switching the engagement and disengagement states of the engagement elements.

After starting the shift control, the ECU 11 determines whether the gear ratio of the target shift speed after the shifting is established (Step S9). If the ECU 11 determines that the gear ratio of the target shift speed is established, the ECU 11 ends the processing. If the ECU 11 cannot determine, in the predetermined period of time, that the gear ratio of the target shift speed is established, the ECU 11 determines that the failure may have occurred in which the engagement elements are not appropriately switched, and makes the failure determination (Step S10). The failure determination is the same as the processing at Step S7 described above.

As described above, according to the hydraulic control device 10 of the present embodiment, the cut-off mechanism 51 reduces (cuts off) the supply of the engagement pressure PL to the second hydraulic oil chamber 83, if the accelerator operation amount is equal to or smaller than a predetermined value, and while the shifting is performed through the engagement and disengagement switching operation from the first shift speed (such as the first forward speed) at which the engagement pressures PSL6 and PL are supplied to the first and second hydraulic oil chambers 74 and 83 to the second shift speed (such as the third forward speed) at which the engagement pressures PSL6 and PL are supplied to the first and second hydraulic oil chambers 74 and 83. Thus, the supply of the engagement pressure PL to the second hydraulic oil chamber 83 is reduced (cut off), so that the torque capacity of the second brake B2 is small compared to the case in which the engagement pressures PSL6 and PL are supplied to the first and second hydraulic oil chambers 74 and 83. Hence, the second brake B2 slides at smaller torque, so that large deceleration of the vehicle is suppressed even if the tie-up occurs during the shifting performed by switching the engagement and disengagement states of the engagement elements.

According to the hydraulic control device 10 of the present embodiment, when the ECU 11 performs the shifting to the third forward speed by switching the engagement and disengagement states of the engagement elements other than the second brake B2 from the state in which the first forward speed is established by supplying the engagement pressures PSL6 and PL to both of the first and second hydraulic oil chambers 74 and 83 and engaging the second brake B2, the ECU 11 maintains the supply of the engagement pressure PSL6 to the first hydraulic oil chamber 74 in a similar manner to the state in which the first forward speed is established. This operation surely maintains the shifting operation to the third forward speed.

According to the hydraulic control device 10 of the present embodiment, when the shifting is completed by switching the engagement and disengagement states of the engagement elements, the ECU 11 stops reducing the supply of the engagement pressure PL to the second hydraulic oil chamber 83, and increases the engagement pressure PL to the second hydraulic oil chamber 83. As a result, the third forward speed as the target shift speed can be established.

The hydraulic control device 10 of the present embodiment performs the shifting from the first forward speed to the third forward speed in the state in which the accelerator operation amount is smaller than the predetermined value. When the accelerator operation amount is equal to or smaller than the predetermined value as in the case of coasting down or power-off upshifting, the engine torque is low, so that the torque capacities required for engagement elements to be engaged by the hydraulic servos is relatively small, and hence, cutting off the supply of the engagement pressure to one of the hydraulic oil chambers causes no problem. Furthermore, it is not necessary to cut off the supply of the engagement pressure in the case where the deceleration of the vehicle is sufficiently small even without cutting off the supply of the engagement pressure, so that unnecessary operations can be reduced to increase the service lives of, for example, the valves, the engagement elements, and the hydraulic servos.

The hydraulic control device 10 of the present embodiment includes the cut-off mechanism 51 that performs the switching between supply and cut-off of the engagement pressure PL to the second hydraulic oil chamber 83, and also includes the linear solenoid valve SL6 that regulates and supplies the engagement pressure PSL6 to the first hydraulic oil chamber 74. Thus, the mechanical cut-off mechanism 51 is provided, so that the operational reliability can be improved compared to a case in which the engagement pressure is controlled so as to be cut off or so as not to be supplied only through the hydraulic control.

According to the hydraulic control device 10 of the present embodiment, the cut-off mechanism 51 includes the switching valve 52, which includes the solenoid valve SR that can output the signal pressure PSR, the input port 52*b* for receiving the engagement pressure PL, the output port 52*c* to be connected to the second hydraulic oil chamber 83, the spool that is capable of switching between the communication position of communicating the input port 52*b* with the output port 52*c* and the cut-off position of cutting off communication between the input port 52*b* and the output port 52*c*, the spring 52*s* for urging the spool toward the cut-off position, and the oil chamber 52*a* that is supplied with the signal pressure PSR such that the spool is urged toward the communication position against the spring 52*s*. As a result, the ECU 11 can easily perform the control between supply and cut-off of the engagement pressure PL with respect to the second hydraulic oil chamber 83 by supplying the control signal from the ECU 11 to the solenoid valve SR.

In the hydraulic control device 10 according to the present embodiment described above, the shifting is performed from the first forward speed to the third forward speed. However, the present disclosure is not limited to this case. The present disclosure applies to, for example, a case of shifting from the first forward speed to the second forward speed and a case of shifting from the second forward speed to the third forward speed.

In the hydraulic control device 10 according to the present embodiment, the supply of the engagement pressure PL to the second hydraulic oil chamber 83 is cut off if the accelerator operation amount is equal to or smaller than the threshold after the start of the shifting operation. However, the present disclosure is not limited to this case. The hydraulic control device 10 may cut off the supply of the engagement pressure PSL6 to the first hydraulic oil chamber 74, instead of cutting off the supply of the engagement pressure PL to the second hydraulic oil chamber 83. In this case, the ECU 11 controls the linear solenoid valve SL6 serving as the cut-off mechanism so as to prevent the engagement pressure PSL6 from being supplied to the first hydraulic oil chamber 74.

In the hydraulic control device 10 according to the present embodiment, the supply of the engagement pressure PL to the second hydraulic oil chamber 83 is cut off if the accelerator operation amount is equal to or smaller than the threshold. However, the present disclosure is not limited to this case. The hydraulic control device 10 may cut off the supply of the engagement pressure PL to the second hydraulic oil chamber 83 regardless of the accelerator operation amount, depending on various conditions.

In the hydraulic control device 10 according to the present embodiment, the hydraulic control device 10 is applied to the automatic transmission 1 that is capable of establishing the ten forward speeds by simultaneously engaging three of the six engagement elements consisting of the first, the second, the third, and the fourth clutches C1, C2, C3, and C4 and the first and the second brakes B1 and B2. However, the present disclosure is not limited to this case. The hydraulic control device 10 can also be applied to any automatic transmission that is capable of establishing another number of shift speeds using another combination of engagement elements. The hydraulic control device 10 may be applied to, for example, an automatic transmission that includes three clutches, two brakes, a one-way clutch, a Ravigneaux type planetary gear set, and a reduction planetary gear, and that is capable of establishing six forward speeds by simultaneously engaging two of the five engagement elements.

In the hydraulic control device 10 according to the present embodiment, the cut-off mechanism 51 is a mechanism including the solenoid valve SR and the switching valve 52. However, the present disclosure is not limited to this case. Any mechanism can be appropriately used that can perform the switching between communication and cut-off of the hydraulic pressure. In the hydraulic control device 10 of the present embodiment, one of the two hydraulic oil chambers serves as the second hydraulic oil chamber 83, so that the cut-off mechanism 51 is capable of switching the supply of the engagement pressure PL. However, the present disclosure is not limited to this example. The cut-off mechanism 51 may be capable of performing the switching between supply and cut-off of the engagement pressure to any one of the hydraulic oil chambers, depending on the structure of the hydraulic servo 70.

In the hydraulic control device 10 according to the present embodiment, the valve body 50 is provided with the cut-off mechanism 51 that is capable of cutting off the supply of the engagement pressure PL to the second hydraulic oil chamber 83. However, the present disclosure is not limited to this case. Instead of the cut-off mechanism 51, a reduction mechanism may be provided that can reduce the supply of the engagement pressure PL to the second hydraulic oil chamber 83. In this case, when the shifting is performed from the first forward speed to the third forward speed, the reduction mechanism reduces the engagement pressure PL supplied to the second hydraulic oil chamber 83 to, for example, 0.2 times to 0.5 times the engagement pressure supplied when the first forward speed is established. For example, a linear solenoid valve can be used as the reduction mechanism in this case. This reduction mechanism also reduces the supply of the engagement pressure PL to the second hydraulic oil chamber 83, so that the torque capacity of the second brake B2 decreases. Hence, the second brake B2 slides at smaller torque, so that large deceleration of the vehicle is suppressed even if the tie-up occurs during the shifting performed by switching the engagement and disengagement states of the engagement elements.

In the hydraulic control device 10 according to the present embodiment, the linear solenoid valve SL6 is used to regulate and supply the engagement pressure PSL6 to the first hydraulic oil chamber 74. However, the present disclosure is not limited to this case. Instead of the linear solenoid valve SL6, a solenoid valve may be used and subjected to duty-cycle control.

INDUSTRIAL APPLICABILITY

The hydraulic control device of the automatic transmission can be used in vehicles, such as passenger cars and trucks, and in particular, is preferably used in devices that can engage and disengage engagement elements using double-chamber hydraulic servos each including a plurality of hydraulic oil chambers for one of the engagement elements.

The invention claimed is:

1. A hydraulic control device of an automatic transmission including a plurality of engagement elements and being capable of establishing a plurality of shift speeds by simultaneously engaging at least selected two of the engagement elements, the hydraulic control device comprising:

two hydraulic oil chambers, wherein a predetermined engagement element of the engagement elements is an engagement element with the two hydraulic oil chambers and is engageable and disengageable when an engagement pressure is supplied to and discharged from at least one of the two hydraulic oil chambers, and a control unit that reduces supply of the engagement pressure to one of the two hydraulic oil chambers to a level lower than that in a state in which a first shift speed is established, when the control unit performs shifting from the state in which the first shift speed is established by supplying the engagement pressures to both of the two hydraulic oil chambers and engaging the predetermined engagement element to a second shift speed by switching engagement and disengagement states of engagement elements other than the predetermined engagement element.

2. The hydraulic control device of an automatic transmission according to claim 1, wherein the control unit maintains supply of an engagement pressure to the other of the two hydraulic oil chambers in a similar manner to the state in which the first shift speed is established, when the control unit performs the shifting from the state in which the first shift speed is established by supplying the engagement pressures to both of the two hydraulic oil chambers and engaging the predetermined engagement element to the second shift speed by switching the engagement and disengagement states of the engagement elements other than the predetermined engagement element.

3. The hydraulic control device of an automatic transmission according to claim 2, wherein the control unit stops reducing the supply of the engagement pressure to one of the two hydraulic oil chambers, and increases the engagement pressure to the hydraulic oil chamber, when the shifting is completed by switching the engagement and disengagement states of the engagement elements.

4. The hydraulic control device of an automatic transmission according to claim 3, wherein the shifting from the first shift speed to the second shift speed is shifting performed when an accelerator operation amount is equal to or smaller than a predetermined value.

5. The hydraulic control device of an automatic transmission according to claim 4, further comprising:

a cut-off mechanism that performs switching between supply and cut-off of the engagement pressure to one of the two hydraulic oil chambers; and a solenoid valve that regulates and supplies the engagement pressure to the other of the two hydraulic oil chambers.

6. The hydraulic control device of an automatic transmission according to claim 5, wherein the predetermined engagement element is a brake including a first hydraulic oil chamber serving as the other of the two hydraulic oil chambers and a second hydraulic oil chamber serving as one of the two hydraulic oil chambers to be placed on an outer circumferential side of the first hydraulic oil chamber.

7. The hydraulic control device of an automatic transmission according to claim 6, wherein the cut-off mechanism includes:

a solenoid valve capable of outputting a signal pressure; and a switching valve including an input port that receives the engagement pressure, an output port to be connected to one of the two hydraulic oil chambers, a spool that is capable of switching between a communication position of communicating the input port with the output port and a cut-off position of cutting off communication between the input port and the output port, an urging member that urges the spool toward the cut-off position, and an oil chamber that is supplied with the signal pressure such that the spool is urged toward the communication position against the urging member.

8. The hydraulic control device of an automatic transmission according to claim 7, wherein the predetermined engagement element is an engagement element that is engaged to establish at least forward and reverse starting shift speeds.

9. The hydraulic control device of an automatic transmission according to claim 5, wherein the cut-off mechanism includes:

a solenoid valve capable of outputting a signal pressure; and a switching valve including an input port that receives the engagement pressure, an output port to be connected to one of the two hydraulic oil chambers, a spool that is capable of switching between a communication position of communicating the input port with the output port and a cut-off position of cutting off communication between the input port and the output port, an urging member that urges the spool toward the cut-off position, and an oil chamber that is supplied with the signal pressure such that the spool is urged toward the communication position against the urging member.

10. The hydraulic control device of an automatic transmission according to claim 1, wherein the shifting from the first shift speed to the second shift speed is shifting performed when an accelerator operation amount is equal to or smaller than a predetermined value.

11. The hydraulic control device of an automatic transmission according to claim 1, further comprising:

a cut-off mechanism that performs switching between supply and cut-off of the engagement pressure to one of the two hydraulic oil chambers; and a solenoid valve that regulates and supplies the engagement pressure to the other of the two hydraulic oil chambers.

12. The hydraulic control device of an automatic transmission according to claim 1, wherein the predetermined engagement element is an engagement element that is engaged to establish at least forward and reverse starting shift speeds.

* * * * *